US009552925B2

(12) United States Patent
Masunari et al.

(10) Patent No.: US 9,552,925 B2
(45) Date of Patent: Jan. 24, 2017

(54) MULTILAYER CERAMIC CAPACITOR

(71) Applicant: Murata Manufacturing Co., Ltd., Nagaokakyo-shi, Kyoto-fu (JP)

(72) Inventors: Akio Masunari, Nagaokakyo (JP); Taisuke Kanzaki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 83 days.

(21) Appl. No.: 14/712,008

(22) Filed: May 14, 2015

(65) Prior Publication Data
US 2015/0340156 A1  Nov. 26, 2015

(30) Foreign Application Priority Data

May 22, 2014 (JP) .................................. 2014-106512
Apr. 8, 2015 (JP) .................................. 2015-078942

(51) Int. Cl.
| | | |
|---|---|---|
| H01G 4/12 | (2006.01) | |
| H01G 4/232 | (2006.01) | |
| H01G 4/008 | (2006.01) | |
| H01G 4/30 | (2006.01) | |

(52) U.S. Cl.
CPC ............ *H01G 4/1227* (2013.01); *H01G 4/008* (2013.01); *H01G 4/0085* (2013.01); *H01G 4/2325* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 9,406,440 B2* | 8/2016 | Yamaguchi | ......... C04B 35/4682 |
| 2008/0304204 A1* | 12/2008 | Suzuki | .................. H01G 4/012 |
| | | | 361/321.3 |
| 2013/0094121 A1 | 4/2013 | Endo et al. | |
| 2014/0078642 A1* | 3/2014 | Shinichi | .................... H01B 3/12 |
| | | | 361/301.4 |
| 2015/0109717 A1 | 4/2015 | Okamoto | |
| 2015/0364259 A1* | 12/2015 | Kanzaki | .................. H01G 4/30 |
| | | | 361/301.4 |

FOREIGN PATENT DOCUMENTS

| | | |
|---|---|---|
| JP | 3334607 B2 | 10/2002 |
| JP | 2013-102123 A | 5/2013 |
| WO | 2014/010376 A1 | 1/2014 |

\* cited by examiner

*Primary Examiner* — Dion R Ferguson
(74) *Attorney, Agent, or Firm* — Keating & Bennett, LLP

(57) ABSTRACT

A multilayer ceramic capacitor includes a ceramic body, and external electrodes on opposite side surfaces of the ceramic body. The ceramic body includes an inner layer portion including a plurality of ceramic layers, and first and second internal electrodes each arranged at interfaces between the ceramic layers defining the inner layer portion, and also includes outer layer portions arranged on an upper surface and a lower surface of the inner layer portion. The ceramic layers defining the inner layer portion include as a main component a perovskite-type compound containing Ba and Ti. The amount of Mg contained in the ceramic layers defining the inner layer portion preferably is 0 to about 0.4 part by mole per 100 parts by mole of Ti, for example. The thickness of the ceramic layers defining the inner layer portion preferably is not more than about 0.55 μm, for example.

17 Claims, 6 Drawing Sheets

MULTILAYER CERAMIC CAPACITOR

BACKGROUND OF THE INVENTION

1. Field of the Invention

The present invention relates to a multilayer ceramic capacitor.

2. Description of the Related Art

In recent years, with the decreasing size and increasing performance of electronic components, a size reduction and an increased capacitance are required in multilayer ceramic capacitors. Such a multilayer ceramic capacitor includes, for example, a ceramic body with a rectangular parallelepiped shape, in which ceramic layers defining an inner layer portion and internal electrodes are laminated alternately, and ceramic layers defining an outer layer portion are arranged on upper and lower surfaces of the laminated body, and also includes external electrodes formed on opposite end surfaces of the ceramic body.

In order to achieve a size reduction and an increased capacity in the multilayer ceramic capacitor, it is necessary to reduce the thickness and increase the lamination density of the ceramic layers defining the inner layer portion (dielectric ceramic layers) and the internal electrodes as much as possible. However, in a multilayer ceramic capacitor in which the dielectric ceramic layers and the internal electrodes have been reduced in thickness and increased in lamination density, if the thickness of the dielectric ceramic layers is further reduced, the insulation resistance between internal electrodes will decrease, leading to reduced reliability. It has therefore been difficult to achieve a smaller thickness and a higher lamination density while ensuring reliability.

Japanese Patent No. 3,334,607 discloses a dielectric ceramic composition for forming a dielectric ceramic layer, for use in a multilayer ceramic capacitor that takes into account the insulation resistance of a dielectric ceramic layer having a reduced thickness between internal electrodes. In a ceramic body in which internal electrodes and dielectric ceramic layers containing barium titanate as a main component are laminated alternately, the dielectric ceramic composition has the composition represented by the formula: $\{BaO\}$ $mTiO_2+\alpha R_2O_3+\beta BaZrO_3+\gamma MgO+gMnO$, where $R_2O_3$ is at least one selected from $Eu_2O_3$, $Gd_2O_3$, $Tb_2O_3$, $Dy_2O_3$, $Ho_2O_3$, $Er_2O_3$, $Tm_2O_3$, and $Yb_2O_3$;

and $\alpha$, $\beta$, $\gamma$, and g each represent a molar ratio, and are in the following ranges: $0.001 \leq \alpha \leq 0.06$; $0.005 \leq \beta \leq 0.06$; $0.001 < \gamma \leq 0.12$; $0.001 < g \leq 0.12$; $\gamma + g \leq 0.13$; and $1.000 < m \leq 1.035$.

However, with the dielectric ceramic composition forming the dielectric ceramic layers in the multilayer ceramic capacitor described in Japanese Patent No. 3,334,607, the reliability significantly decreases in the case of a multilayer ceramic capacitor including regions of dielectric ceramic layers with a reduced thickness (not more than 0.55 μm).

SUMMARY OF THE INVENTION

Preferred embodiments of the present invention provide a multilayer ceramic capacitor having excellent reliability and in which a thickness of dielectric ceramic layers is significantly reduced while a decrease in insulation resistance is prevented.

A multilayer ceramic capacitor according to a preferred embodiment of the present invention includes a ceramic body including a first end surface and a second end surface opposite to the first end surface; a first side surface and a second side surface perpendicular or substantially perpendicular to the first end surface and the second end surface; a first main surface and a second main surface perpendicular or substantially perpendicular to the first end surface and the first side surface; a plurality of dielectric ceramic layers; and internal electrodes extending in a direction connecting the first main surface and the second main surface, with a respective one of the dielectric ceramic layers interposed between adjacent ones of the internal electrodes; and external electrodes each provided on a respective one of the first end surface and the second end surface of the ceramic body; wherein the internal electrodes include a first internal electrode and a second internal electrode; the first internal electrode and the second internal electrode extend alternately to a respective one of the first end surface and the second end surface to be connected with a respective one of the external electrodes; an inner layer portion of the ceramic body includes a region sandwiched between the internal electrodes located nearest to the first and second main surfaces, and an outer layer portion including the dielectric ceramic layers located nearest to each of the first and second main surfaces; the dielectric ceramic layers of the inner layer portion including as a main component a perovskite-type compound containing Ba and Ti; an amount of Mg contained in the dielectric ceramic layers of the inner layer portion is not less than 0 part by mole and not more than about 0.4 part by mole, per 100 parts by mole of Ti; and each of the dielectric ceramic layers of the inner layer portion has a thickness of not more than about 0.55 μm.

Preferably, in a multilayer ceramic capacitor according to a preferred embodiment of the present invention, a side margin is defined by a region not containing the first internal electrode and the second internal electrode when the ceramic body is seen in the lamination direction, the amount of Mg in the side margin is not less than about 0.5 part by mole and not more than about 5.0 parts by mole, per 100 parts by mole of Ti.

According to a preferred embodiment of the present invention, a multilayer ceramic capacitor that is able to withstand deterioration of insulation resistance is provided in which the amount of Mg contained in the dielectric ceramic layers preferably is not less than 0 part by mole and not more than about 0.4 part by mole, per 100 parts by mole of Ti, and the dielectric ceramic layers of the inner layer portion preferably have a thickness of not more than about 0.55 μm, for example. This multilayer ceramic capacitor is a highly reliable multilayer ceramic capacitor in which the thickness of the dielectric ceramic layers is significantly reduced.

Further, in particular, in thin-layer regions having a thickness of not more than about 0.55 μm, the distance between ends of the internal electrodes becomes close. Thus, when the amount of Mg contained therein is extremely low, a short circuit tends to occur, which may cause a short-circuit failure. However, when the amount of Mg contained in the side margin is not less than about 0.5 part by mole and not more than about 5.0 parts by mole, per 100 parts by mole of Ti, for example, a foreign layer is formed at the ends of the internal electrodes, which effectively prevents the occurrence of a short-circuit failure caused by a short circuit at the ends of the internal electrodes.

According to various preferred embodiments of the present invention, a multilayer ceramic capacitor achieves excellent reliability and a significantly reduced thickness of dielectric ceramic layers while a decrease in insulation resistance is prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
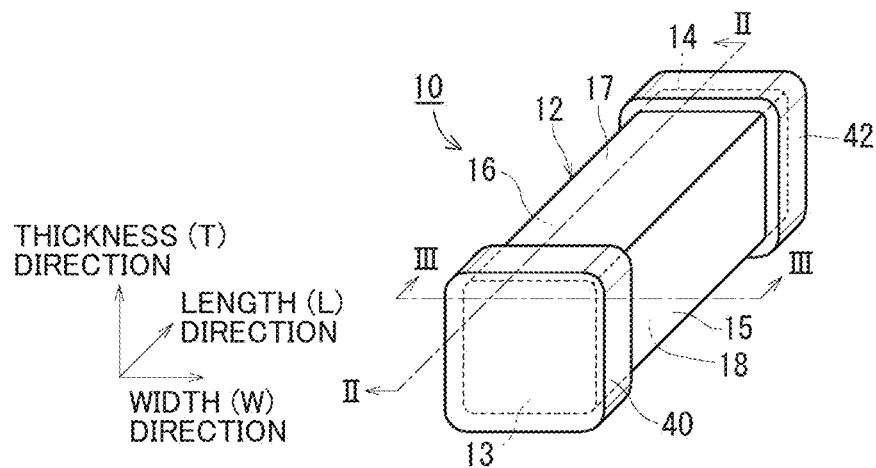
FIG. 1 is a schematic perspective view showing an exemplary appearance of a multilayer ceramic capacitor according to a preferred embodiment of the present invention.
Figure 2:
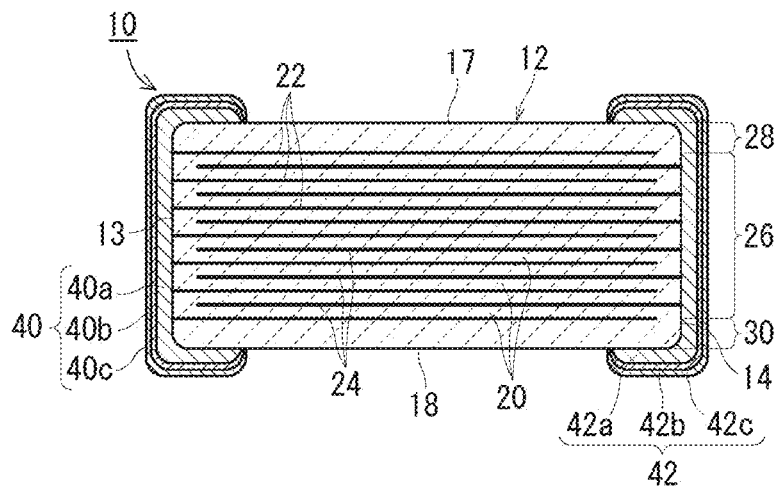
FIG. 2 is a diagram showing a cross section along line II-II in FIG. 1.
Figure 3:
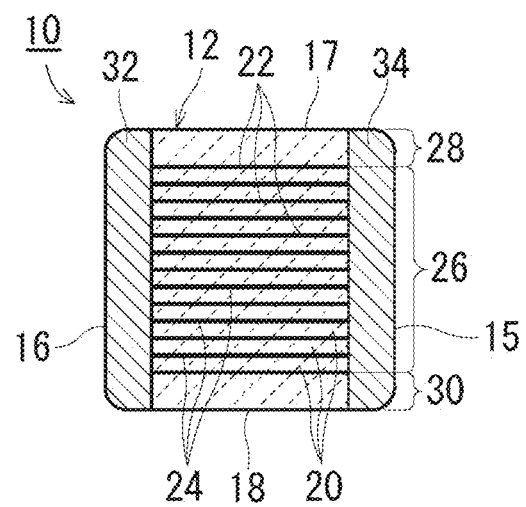
FIG. 3 is a diagram showing a cross section along line III-III in FIG. 1.
Figure 4:
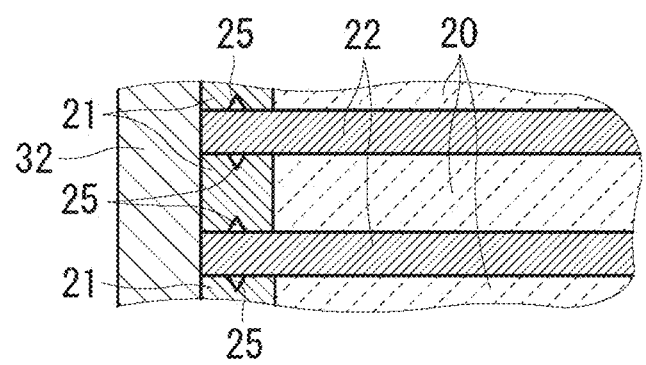
FIG. 4 is an enlarged view of a connected portion between a side margin and internal electrodes.

Exemplary multilayer ceramic capacitors according to preferred embodiments of the present invention will be described. FIG. 1 is a schematic perspective view of a multilayer ceramic capacitor, as an exemplary appearance of a multilayer ceramic capacitor including a ceramic body and external electrodes. FIG. 2 is a diagram showing a cross section along line II-II in FIG. 1. FIG. 3 is a diagram showing a cross section along line III-III in FIG. 1. FIG. 4 is an enlarged view of a connected portion between a side margin and internal electrodes.

A multilayer ceramic capacitor 10 according to the present preferred embodiment generally includes a ceramic body 12, and external electrodes 40, 42 each provided on opposite end surfaces of the ceramic body 12.

The ceramic body 12 preferably has a rectangular or substantially rectangular parallelepiped shape, and includes a first end surface 13 and a second end surface 14 extending along a width (W) direction and a lamination (T) direction; a first side surface 15 and a second side surface 16 extending along a length (L) direction and the lamination (T) direction; and a first main surface 17 and a second main surface 18 extending along the length (L) direction and the width (W) direction. In the ceramic body 12, the first end surface 13 and the second end surface 14 are opposite to each other, the first side surface 15 and the second side surface 16 are opposite to each other, and the first main surface 17 and the second main surface 18 are opposite to each other. Moreover, the first side surface 15 and the second side surface 16 are perpendicular or substantially perpendicular to the first end surface 13 and the second end surface 14, and the first main surface 17 and the second main surface 18 are perpendicular or substantially perpendicular to the first end surface 13 and the first side surface 16. Further, corner portions and ridge portions of the ceramic body 12 are preferably rounded.

The ceramic body 12 preferably includes an inner layer portion 26 including a plurality of ceramic layers (dielectric ceramic layers) 20, and first internal electrodes 22 and second internal electrodes 24 arranged at interfaces between the ceramic layers 20; outer layer portions 28, 30 in which the ceramic layers defining an outer layer portion are arranged to sandwich the inner layer portion 26 in the lamination (T) direction; and side margins 32, 34 in which ceramic layers defining the side margins are arranged to sandwich the inner layer portion 26 and the outer layer portions 28, 30 in the width (W) direction. In other words, in the ceramic body 12, the inner layer portion 26 corresponds to a region sandwiched between the first or second internal electrode 22 or 24 located nearest to the first main surface 17 and the first or second internal electrode 22 or 24 located nearest to the second main surface 18. The side margins 32, 34 correspond to regions not containing the first internal electrodes 22 and the second internal electrodes 24 when the ceramic body 12 is seen in the lamination (T) direction.

The ceramic layers defining the inner layer portion 20 include, as a main component, a perovskite-type compound containing Ba and Ti, for example, and including dielectric ceramic particles having a perovskite structure. The thickness of each of the ceramic layers defining the inner layer portion 20 after baking preferably is not more than about 0.55 μm, for example. Moreover, the dielectric ceramic particles of the ceramic layers 20 defining the inner layer portion 26 preferably have a grain size of not more than about 0.18 μm, for example. Further, the amount of Mg contained in the ceramic layers defining the inner layer portion 20 preferably is not less than 0 part by mole and not more than about 0.4 part by mole, per 100 parts by mole of Ti, for example.

Figure 5:
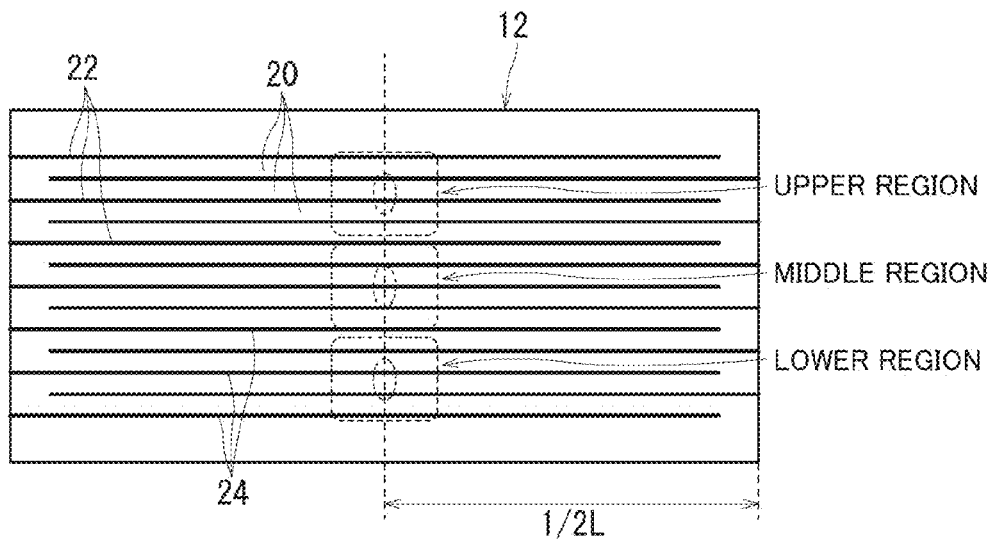
FIG. 5 is an explanatory diagram showing regions used to measure a thickness of ceramic layers for an inner layer portion, where no external electrodes are shown.

It is noted that the thickness of the ceramic layers defining the inner layer portion 20 is preferably measured as follows. FIG. 5 is an explanatory diagram showing regions used to measure the thickness of the ceramic layers defining the inner layer portion 20. In FIG. 5, the external electrodes are not shown.

The multilayer ceramic capacitor 10 is ground with a grinder, for example, such that it is exposed in a position approximately half its length in the width (W) direction, so as to expose a surface of the multilayer ceramic capacitor 10 in the length (L) direction and the lamination (T) direction (hereinafter referred to as the "LT cross section"). Further, in order to eliminate sagging of the internal electrodes 22 and 24, after grinding is completed, the ground surfaces are machined using ion milling.

Then, as shown in FIG. 5, in a position approximately half its length in the length (L) direction of the LT cross section, a straight line substantially perpendicular or substantially perpendicular to the internal electrodes 22, 24 is determined. The region where the first and second internal electrodes 22, 24 are laminated in the multilayer ceramic capacitor 10 is equally divided into three regions in the lamination (T) direction, i.e., an upper region, a middle region, and a lower region. Then, excluding any portion where the thickness of ceramic layer for the inner layer portion 20 cannot be measured due to, for example, a portion of the ceramic layers defining the inner layer portion 20 being formed like a column across two layers through partly defective first or second internal electrode 22 or 24, thicknesses of ten random ceramic layers defining the inner layer portion 20 on the above-described perpendicular or substantially perpendicular straight line are measured near the center of each region, an average value thereof is obtained, and the average value is determined as the thickness of the ceramic layers defining the inner layer portion 20. The thickness of the ceramic layers defining the inner layer portion 20 is measured using a scanning electron microscope (SEM).

It is noted that the thickness of the internal electrodes 22, 24 can also be measured as in the method for measuring the thickness of the ceramic layers defining the inner layer portion 20. That is, thicknesses of ten random internal electrodes 22, 24 on a straight line substantially perpendicular or substantially perpendicular to the internal electrodes 22, 24 are measured near the center of each region, an average value thereof is calculated, and the average value is determined as the thickness of the internal electrodes 22, 24.

Figure 6:
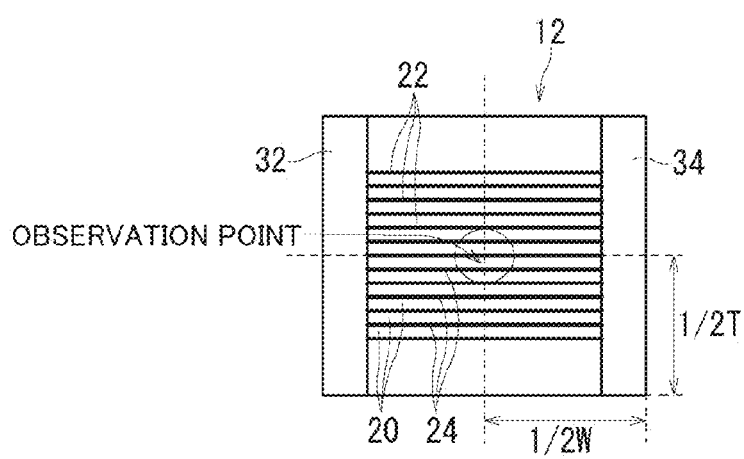
FIG. 6 is an explanatory diagram showing an observation point used to measure a grain size of dielectric ceramic particles of the ceramic layers defining the inner layer portion.

The grain size of the dielectric ceramic particles of the ceramic layers defining the inner layer portion 20 preferably is measured as follows. FIG. 6 is an explanatory diagram showing an observation point used to measure the grain size of the dielectric ceramic particles of the ceramic layers defining the inner layer portion 20.

The multilayer ceramic capacitor 10 is broken in a position approximately half its length in the length (L) direction, so as to expose a surface of the multilayer ceramic capacitor 10 in the width (W) direction and the lamination (T) direction (hereinafter referred to as the "WT cross section"). Then, the multilayer ceramic capacitor 10 is heat-treated, in order to clarify boundaries between grains (grain boundaries) contained in the ceramic layers defining the inner layer portion 20 exposed in the WT cross section. The temperature for the heat treatment may be a temperature at which the grains do not grow and the grain boundaries are clarified, and may be approximately 1,000° C., for example.

Then, as shown in FIG. 6, in a position approximately half its length in the width (W) direction and half its length in the lamination (T) direction of the WT cross section, grains of the dielectric ceramic particles of the ceramic layers defining the inner layer portion 20 are observed with a scanning electron microscope (SEM) at a prescribed magnification. From the obtained SEM image, 300 grains are randomly extracted, an area of the inside portion of the grain boundary of each grain is obtained using an image analysis, the diameter of a virtual circle having that area is calculated, and a D50 value thereof is obtained. This measurement is conducted for five multilayer ceramic capacitors 10, and an average value of D50 values of these multilayer ceramic capacitors 10 is determined as the grain size.

For each of outer layer portions 28, 30 arranged on the upper and lower portions, the same dielectric ceramic material as that of the ceramic layers defining the inner layer portion 20 preferably is used. It is noted that the outer layer portions 28, 30 may be formed of a dielectric ceramic material different from that of the ceramic layers defining the inner layer portion 20. The outer layer portions 28, 30 preferably contain Si in an amount greater than that in the ceramic layers defining the inner layer portion 20. Such a large amount of Si makes it difficult for a plating solution to pass through the outer layers. The thickness of each of the outer layer portions 28, 30 after baking preferably is about 30 μm, for example.

The first internal electrode 22 and the second internal electrode 24 are opposite to each other in the thickness direction, with one of the ceramic layers defining the inner layer portion 20 interposed therebetween. A capacitance is generated in this portion where the first internal electrode 22 and the second internal electrode 24 are opposite to each other, with one of the ceramic layers defining the inner layer portion 20 interposed therebetween.

As shown in FIG. 2, the left end of the first internal electrode 22 extends to the first end surface 13 of the ceramic body 12 to be electrically connected with the external electrode 40. The right end of the second internal electrode 24 extends to the second end surface 14 of the ceramic body 12 to be electrically connected with the external electrode 42.

The first and second internal electrodes 22, 24 preferably are made of Ni or Cu, for example. The thickness of each of the first and second internal electrodes 22, 24 is preferably not less than about 0.3 μm and not more than about 2.0 μm, for example.

The side margins 32, 34 are preferably made of a dielectric ceramic material having a perovskite structure containing $BaTiO_3$ as a main component, for example. The amount of Mg contained in the side margins 32, 34 preferably is not less than about 0.5 part by mole and not more than about 5.0 parts by mole, per 100 parts by mole of Ti, for example.

Mg contained in the side margin 32 is supplied to the ceramic layers defining the inner layer portion 20, where it is reacted with the main component, Ni, of the internal electrodes 22, forming a compound containing Ni and Mg. As shown in FIG. 4, this compound is formed near the side margin 32 as a protrusion 25 projecting from the internal electrode 22 toward the ceramic layers defining the inner layer portion 20. A protrusion 25 is provided in a position about 50 μm inside from the end of the internal electrode 22. The size of the protrusion preferably is about 0.1 μm to about 0.2 μm, for example.

Further, when the amount of Mg contained in the side margins 32, 34 is not less than about 0.5 part by mole and not more than about 5.0 parts by mole, per 100 parts by mole of Ti, a foreign layer containing a large amount of Mg is formed at the end of the ceramic layers defining the inner layer portion 20 and the internal electrode 22, as shown in FIG. 4.

It is noted that the composition of the side margins 32, 34 can be checked by cutting the side margins 32, 34 from the multilayer ceramic capacitor 10, and subjecting the cut side margins to an ICP analysis.

Moreover, the composition of the ceramic layers defining the inner layer portion 20 can be checked by removing the side margins 32, 34 from the multilayer ceramic capacitor 10, and then etching away the internal electrodes 22, 24 only, followed by an ICP analysis of the ceramic layers defining the inner layer portion 20. Alternatively, the composition of the ceramic layers defining the inner layer portion 20 can be checked by separating the internal electrodes 22, 24 from the ceramic layers defining the inner layer portion 20, and then cutting away the ceramic layers defining the inner layer portion 20, followed by an ICP analysis thereof.

External electrodes 40, 42 preferably have a three-layered structure including electrode layers 40a, 42a containing Cu that are formed by baking, first plating layers 40b, 42b containing Ni formed on the surfaces of electrode layers 40a, 42a to prevent solder erosion, and second plating layers 40c, 42c containing Sn formed on the surfaces of first plating layers 40b, 42b.

In the multilayer ceramic capacitor 10 shown in FIG. 1, the dielectric ceramic particles of the ceramic layers defining the inner layer portion 20 preferably have a grain size of not more than about 0.18 μm, and the amount of Mg contained in the ceramic layers defining the inner layer portion 20 in the inner layer portion 26 preferably is not less than 0 part by mole and not more than about 0.4 part by mole, per 100 parts by mole of Ti. Thus, even though the multilayer ceramic capacitor 10 preferably has a thickness of not more than about 0.55 μm, the multilayer ceramic capacitor 10 is able to withstand deterioration of insulation resistance while ensuring high reliability.

A reason why the reliability of the multilayer ceramic capacitor 10 decreases when the amount of Mg is increased in the ceramic layers defining the inner layer portion 20 having a reduced thickness is believed to be as follows. As described above, a compound containing Ni and Mg is formed by the reaction of Mg contained in the ceramic layers defining the inner layer portion 20 with Ni as the main component of the internal electrodes 22, 24. This compound, which is formed as the protrusion 25 projecting from the internal electrode 22 or 24 toward the ceramic layers defining the inner layer portion 20, reduces the insulation property of the portion where it is formed. This has a significant influence particularly on the thin-layer regions of the ceramic layers defining the inner layer portion 20, and dielectric ceramic particles having a large grain size.

Thus, the formation of the compound containing Ni and Mg is reduced by reducing the amount of Mg contained in the ceramic layers defining the inner layer portion 20 much more than the conventionally used amount. It is believed that as a consequence of this, the insulation property of the ceramic layers defining the inner layer portion 20 is maintained. On the other hand, the protrusion 25 projecting from the internal electrode 22 or 24 toward the ceramic layer defining the inner layer portion 20 prevents removal of the internal electrode 22 or 24 from the ceramic layers defining the inner layer portion 20. Further, the side margins 32, 34 may contain a larger amount of Si than in the ceramic layers defining the inner layer portion 20, as well as Mg. This allows the plating solution to be prevented from entering the inner layers, as in the outer layers.

Further, because the amount of Mg contained in the side margins 32, 34 of the multilayer ceramic capacitor 10 shown in FIG. 1 preferably is not less than about 0.5 part by mole and not more than about 5.0 parts by mole, per 100 parts by mole of Ti, for example, a foreign layer 21 is able to be formed at the ends of the internal electrodes 22, 24. This ensures the insulation property, and therefore, a short-circuit failure caused by a short circuit occurring at the ends of the internal electrodes is effectively prevented.

Figure 7A:
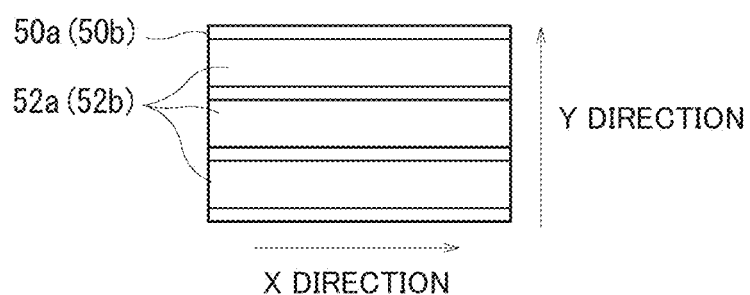
FIG. 7A is an explanatory diagram for illustrating a method for manufacturing a multilayer ceramic capacitor, as a perspective view schematically showing the state in which conductive films are formed on ceramic green sheets.
Figure 7B:
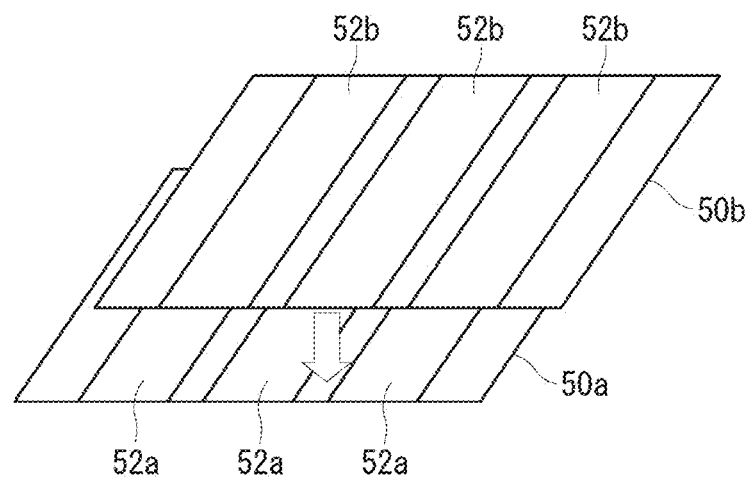
FIG. 7B is an explanatory diagram for illustrating a method for manufacturing a multilayer ceramic capacitor, as a perspective view schematically showing the state in which the ceramic green sheets having the conductive films formed thereon are stacked on each other.
Figure 8:
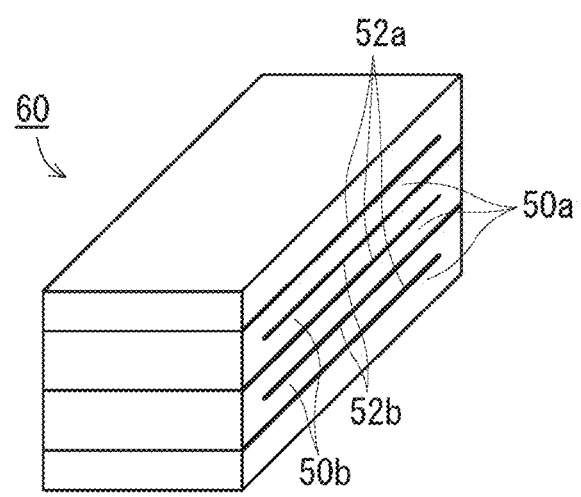
FIG. 8 is a schematic perspective view showing an exemplary appearance of a laminated chip manufactured using the method for manufacturing a multilayer ceramic capacitor shown in FIGS. 7A and 7B.

Next, a non-limiting example of a method for manufacturing a multilayer ceramic capacitor according to a preferred embodiment of the present invention will be described. FIG. 7A is an explanatory diagram for illustrating the non-limiting example of a method for manufacturing a multilayer ceramic capacitor according to a preferred embodiment of the present invention, as a perspective view schematically showing the state in which conductive films are formed on ceramic green sheets. FIG. 7B is an explanatory diagram for illustrating the non-limiting example of a method for manufacturing a multilayer ceramic capacitor according to a preferred embodiment of the present invention, as a perspective view schematically showing the state in which the ceramic green sheets having the conductive films formed thereon are stacked on each other. FIG. 8 is a schematic perspective view showing an exemplary appearance of a laminated chip manufactured using the non-limiting example of a method for manufacturing a multilayer ceramic capacitor according to a preferred embodiment of the present invention shown in FIGS. 7A and 7B. The manufacturing method will be described in detail below.

First, a high-purity $BaCO_3$ powder and a high-purity $TiO_2$ powder are prepared at a ratio of Ba:Ti=1:1, as starting materials of the main component, $BaTiO_3$. It is noted that the Ba:Ti ratio is not limited to 1:1 in the present invention.

Next, these prepared powders are wet-mixed in a ball mill to be uniformly dispersed, and then subjected to drying treatment, thus providing an adjusted powder. The adjusted powder is then temporarily baked at a temperature of 1000° C. to 1200° C., producing a main component powder $BaTiO_3$ with an average particle size of 0.15 μm.

Meanwhile, MgO, $SiO_2$, $Dy_2O_3$, $MnO_2$, $V_2O_5$, and $ZrO_2$ powders are prepared as auxiliary components. Next, each of MgO, $SiO_2$, $Dy_2O_3$, $MnO_2$, $V_2O_5$, and $ZrO_2$ powders is weighed such that the amount of Mg, Si, Dy, Mn, V, and Zr contained per 100 parts by mole of Ti are as follows: Mg: not less than 0 part by mole and not more than 0.4 part by mole; Si: 2 parts by mole; Dy: 1 part by mole; Mn: 0.5 part by mole; V: 0.1 part by mole; and Zr: 0.25 part by mole. These powders are then added to the above-mentioned main component powder so as to provide a mixed powder.

Next, this mixed powder is wet-mixed in a ball mill to be uniformly dispersed, and then subjected to drying treatment, thus providing a dielectric raw material powder. The composition of the dielectric raw material powder can be confirmed to be substantially the same as the prepared composition, through an ICP analysis of this dielectric raw material powder.

Then, ethanol as a plasticizer and an organic solvent and a polyvinyl butyral-based binder are added to the obtained ceramic raw material, and these components are wet-mixed in a ball mill, thus providing ceramic slurry. This ceramic slurry is sheet-molded onto a resin film (not shown) using a lip method into a plurality of rectangular ceramic green sheets 50a (50b). The ceramic slurry is molded into ceramic green sheets 50a (50b) using a die coater, a gravure coater, a microgravure coater, or the like, for example.

Next, as shown in FIG. 7A, a conductive paste to define internal electrodes containing Ni as a main component of an electrical conductor is screen-printed in the form of stripes over the surfaces of ceramic green sheets 50a (50b) in the X direction, and then dried, forming conductive films 52a (52b) serving as internal electrodes 22 (24). Any of various printing methods can be used, such as screen printing, ink jet printing, gravure printing, or the like.

Then, as shown in FIG. 7B, the plurality of ceramic green sheets 50a, 50b having conductive films 52a, 52b printed thereon are staggered in a direction (the width direction of conductive films 52a, 52b; Y direction) perpendicular or substantially perpendicular to a direction (X direction) in which the conductive films 52a, 52b are printed, and are laminated on each other. Further, a prescribed number of ceramic green sheets having no conductive film thereon are laminated, as required, on an upper surface and a lower surface of the thus-layered ceramic green sheets 50a, 50b, so as to provide a mother laminate.

The mother laminate is then pressed. The mother laminate may be pressed using a rigid body press, a hydrostatic pressure press, or the like. Then, the pressed mother laminate is cut into the form of chips, providing laminated chips such as the laminate chip 60 as shown in FIG. 8. The mother laminate may be cut using any of various methods such as press-cutting, dicing, laser, or the like.

By way of the foregoing steps, only the conductive films 52a of the ceramic green sheets 50a are exposed on one end surface of the opposite end surfaces of the laminated chip 60, while only the conductive films 52b of the ceramic green sheets 50b are exposed on the other end surface. On the opposite side surfaces of the laminated chip 60, the conductive films 52a of the ceramic green sheets 50a and the conductive films 52b of the ceramic green sheets 50b are each exposed.

Next, layers that define the side margins 32, 34 are formed on the opposite side surfaces of the laminated chip 60 shown in FIG. 8, thus providing a pre-baked laminated chip. The layers defining the side margins 32, 34 are formed on the laminated chip 60, either by attaching the ceramic green sheets for the side margins, or by applying ceramic slurry for the side margins. The composition of the ceramic green sheets or the ceramic slurry for the side margins is prepared such that the amount of Mg contained per 100 parts by mole of Ti is not less than about 0.5 part by mole and not more than about 5.0 parts by mole, for example.

Then, the laminated chip having the layers defining the side margins 32, 34 formed thereon is heated in a nitrogen atmosphere for 3 hours at a temperature of 300° C. to burn the binder, and then baked under the conditions of a heating rate of 100° C./sec, a highest temperature of not less than 1100° C. and not more than 1300° C., and an atmosphere within a furnace facility at not less than 1 ppm and not more than 5000 ppm, without any time for keeping, and then re-baked at a heating rate of 3° C./min and a highest temperature of not less than 1000° C. and not more than 1100° C., thus providing sintered ceramic body 12.

A plating treatment is then conducted by applying a Cu paste containing a glass frit over the first end surface 13 and the second end surface 14 of the obtained ceramic body 12, and baking the resulting material in a nitrogen atmosphere at a temperature of 800° C., for example, thus, forming the external electrodes 40, 42 electrically connected with the first and second internal electrodes 22, 24. The multilayer ceramic capacitor 10 shown in FIG. 1 is manufactured as described above.

EXPERIMENTAL EXAMPLES

In the Experimental Examples, multilayer ceramic capacitor samples according to Examples 1 to 12, Reference Examples 1 to 23, and Comparative Examples 1 to 6 shown below were manufactured, and these multilayer ceramic capacitor samples were evaluated using the high-temperature load test for these samples.

1. Production of Samples

Samples of the Experimental Examples listed in Table 1 (Ex. 1-12, Ref. Ex. 1-23, and Comp. Ex. 1-6) were produced in accordance with the non-limiting example of a method for manufacturing a multilayer ceramic capacitor described above.

(1) Production of Dielectric Raw Material Powders

First, a high-purity $BaCO_3$ powder and a high-purity $TiO_2$ powder were prepared at a ratio of Ba:Ti=1:1, as starting materials of the main component, $BaTiO_3$.

Next, these prepared powders were wet-mixed in a ball mill to be uniformly dispersed, and then subjected to drying treatment, thus giving an adjusted powder. The adjusted powder was then temporarily baked at a temperature of 1000° C., thus providing a main component powder $BaTiO_3$ with an average particle size of 0.15 μm.

Meanwhile, MgO, $SiO_2$, $Dy_2O_3$, $MnO_2$, $V_2O_5$, and $ZrO_2$ powders were prepared as auxiliary components. Next, each of MgO, $SiO_2$, $Dy_2O_3$, $MnO_2$, $V_2O_5$, and $ZrO_2$ powders was weighed such that the amount of Si, Dy, Mn, V, and Zr contained per 100 parts by mole of Ti were as follows: Si: 2 parts by mole; Dy: 1 part by mole; Mn: 0.5 part by mole; V: 0.1 part by mole; and Zr: 0.25 part by mole. These powders were then added to the above-mentioned main component powder, giving a mixed powder. In Table 1, the amount of Mg is shown as an amount of Mg (part by mole) added to 100 parts by mole of Ti for each of the samples used in the examples, Reference examples, and comparative examples. The amount of Mg shown in Table 1 is not less than 0 part by mole and not more than 1 part by mole. Mg was added to the main component powder in the form of MgO.

Next, this mixed powder was wet-mixed in a ball mill to be uniformly dispersed, and then subjected to drying treatment, giving a dielectric raw material powder. An ICP analysis of this dielectric raw material powder confirmed that the dielectric raw material powder had substantially the same composition as the prepared composition.

(2) Manufacture of Multilayer Ceramic Capacitors

Then, ethanol as a plasticizer and an organic solvent and polyvinyl butyral-based binder were added to the above-mentioned ceramic raw material, and these components were wet-mixed in a ball mill, preparing ceramic slurry. This ceramic slurry was then sheet-molded using the lip method into rectangular or substantially rectangular ceramic green sheets.

Next, a conductive paste defining internal electrodes containing Ni as a main component of an electrical conductor was screen-printed or gravure-printed in the form of stripes over the above-mentioned ceramic green sheets, forming conductive films defining the internal electrodes.

The ceramic green sheets having the conductive films printed thereon were then staggered in the direction (the width direction of the conductive films) perpendicular or substantially perpendicular to the direction in which the conductive films were printed, and were laminated on each other. Further, a prescribed number of ceramic green sheets having no conductive film thereon were laminated on an upper surface and a lower surface of the thus-layered ceramic green sheets, so as to provide a mother laminate. The mother laminate was then pressed by being crimped with a hydrostatic pressure press or a rigid body press.

The pressed mother laminate was then cut into the form of chips, thus providing laminated chips in which the conductive films defining the individual internal electrodes were exposed on the opposite end surfaces and the opposite side surfaces.

Next, layers defining the side margins were formed on the opposite side surfaces of the laminated chip, providing a pre-baked laminated chip. The layers defining the side margins were formed on the laminated chip by attaching ceramic green sheets to define the side margins. The composition of the ceramic green sheets defining the side margins was prepared such that the amount of Mg contained per 100 parts by mole of Ti was not less than about 0.5 part by mole and not more than about 5.0 parts by mole, for example.

Then, the laminated chip including the layers defining the side margins formed thereon was heated in a nitrogen atmosphere for 3 hours at a temperature of 300° C. to burn the binder, and then baked under the conditions of a heating rate of 100° C./sec, a highest temperature of not less than 1100° C. and not more than 1300° C., and an atmosphere within a furnace facility at not less than 1 ppm and not more than 5000 ppm, without any time for keeping, and then re-baked at a heating rate of 3° C./min and a highest temperature of not less than 1000° C. and not more than 1100° C., thus providing a sintered ceramic body.

A Cu paste containing a glass frit was then applied over the opposite end surfaces of the obtained ceramic body, and baked in a nitrogen atmosphere at a temperature of 800° C., forming external electrodes electrically connected with the internal electrodes. In this manner, multilayer ceramic capacitor samples according to each of the examples, reference examples, and comparative examples were obtained.

It is noted that the outside dimensions of each of the multilayer ceramic capacitors (including the external electrodes) obtained by the above-described manufacturing method were as follows: length: 0.6 mm; width: 0.3 mm; thickness: 0.3 mm; the thickness per ceramic layer for inner layer portion: not less than 0.3 μm and not more than 1.3 μm. Three-hundred internal electrodes were laminated, and the internal electrodes had an average thickness of 0.5 μm. The thickness of the ceramic layers defining the inner layer portion of each sample according to each of the examples, reference examples, and comparative examples is shown in Table 1. The thickness per outer layer portion was 30 μm.

The thickness of the ceramic layers defining the inner layer portion was measured following the procedure described below.

2. Method for Measuring the Thickness of Ceramic Layers Defining the Inner Layer Portion
(1) Grinding First, each of the multilayer ceramic capacitor samples according to the examples, reference examples, and comparative examples was allowed to stand upright, and the sample was embedded in cured resin. At this time, the sample was ground with a grinder, so as to expose a LT cross section of the sample in a position approximately half its length in the width (W) direction. Further, in order to eliminate sagging of the internal electrodes, after grinding was completed, the ground surfaces were machined using ion milling.

(2) Measurement of the Thickness of Ceramic Layers Defining the Inner Layer Portion Then, as shown in FIG. 5, in a position approximately half its length in the length (L) direction of the LT cross section, a straight line substantially perpendicular or substantially perpendicular to the internal electrodes was determined. Next, the region where the internal electrodes were laminated in the sample was equally divided into three regions in the lamination (T) direction, i.e., an upper region, a middle region, and a lower region. Then, excluding any portion where the thickness of a ceramic layer for the inner layer portion cannot be measured due to, for example, the ceramic layer for the inner layer portion being formed like a column across two layers through a partly defective internal electrode, thicknesses of ten random ceramic layers defining the inner layer portion on the above-described perpendicular or substantially perpendicular straight line were measured near the center of each region, and an average value thereof was obtained. Three samples were used for measurement in each of Examples 1 to 12, Reference Examples 1 to 23, and Comparative Examples 1 to 6. Hence, the thickness of the ceramic layers defining the inner layer portion was calculated as an average value of the values for 90 layers in each of Examples 1 to 12, Reference Examples 1 to 23, and Comparative Examples 1 to 6. The thickness of the ceramic layers defining the inner layer portion was measured using a scanning electron microscope (SEM). Table 1 shows the thickness of the ceramic layers defining the inner layer portion in each of Examples 1 to 12, Reference Examples 1 to 23, and Comparative Examples 1 to 6.

Further, the grain size of the dielectric ceramic particles of the ceramic layers defining the inner layer portion for each sample according to each of Examples 1 to 12, Reference Examples 1 to 23, and Comparative Examples 1 to 6 was measured, following the procedure described below.

3. Method for Measuring the Grain Size of the Dielectric Ceramic Particles of Ceramic Layers Defining the Inner Layer Portion
(1) Production of Samples for Observation First, each sample was broken in a position approximately half its length in the length (L) direction, so as to expose a surface of the sample in the width (W) direction and the lamination (T) direction (hereinafter referred to as the "WI cross section"). Then, the sample was heat-treated, in order to clarify boundaries between grains (grain boundaries) in the ceramic layers defining the inner layer portion exposed in the WT cross section. The temperature for the heat treatment was set to a temperature at which the grains did not grow and the grain boundaries were clarified, and in the present Experimental Examples, the heat treatment was performed at 1000° C.

(2) Measurement of the Grain Size

Then, as shown in FIG. 6, in a position approximately half its length in the width (W) direction and half its length in the lamination (T) direction of the WT cross section, grains of the dielectric ceramic particles of the ceramic layers defining the inner layer portion were observed with a scanning electron microscope (SEM) at 50,000 times magnification. From the obtained SEM image, 300 grains were randomly extracted, an area of the inside portion of the grain boundary of each grain was obtained using an image analysis, the diameter of a virtual circle having that area was calculated, and a D50 value thereof was obtained. This measurement was conducted for five samples in each of Examples 1 to 12, Reference Examples 1 to 23, and Comparative Examples 1 to 6, and an average value of D50 values of these samples was determined as the grain size. As a result of the measurements, the grain size was not more than 0.18 μm.

4. High-Temperature Load Test and Evaluation Results

Each sample was evaluated by conducting a high-temperature load test, and measuring deterioration of insulation resistance.

The high-temperature load test was conducted on samples according to each of Examples 1 to 12, Reference Examples 1 to 23, and Comparative Examples 1 to 6, in accordance with the method described below.

First, from the samples prepared in each of Examples 1 to 12, Reference Examples 1 to 23, and Comparative Examples 1 to 6, ten samples were randomly taken. Then, the high-temperature load test was conducted at 150° C. and 6.3 V. The time at which the insulation resistance became not more than 10 KΩ was evaluated as a failure. The MTTF (Mean Time To Failure) was calculated from this failure time, and calculated MTTFs were compared.

Table 1 shows the evaluation result of the high-temperature load test conducted on the samples according to each of Examples 1 to 12, Reference Examples 1 to 23, and Comparative Examples 1 to 6. The evaluation criterion based on the MTTF was set to 12 hours. In Table 1, the evaluation "G" represents a good sample having an MTTF of not less than 12 hours, while the evaluation "NG" represents a defective sample having an MTTF of less than 12 hours.

TABLE 1

| | Thickness (μm) of Ceramic layers defining the inner layer portion | Amount of Mg (Part by Mole) | MTTF (Time) | Evaluation |
|---|---|---|---|---|
| Ex. 1 | 0.55 | 0.4 | 35 | G |
| Ex. 2 | 0.5 | 0.4 | 20 | G |
| Ex. 3 | 0.4 | 0.4 | 17 | G |
| Ex. 4 | 0.3 | 0.4 | 16 | G |
| Ex. 5 | 0.55 | 0.2 | 27 | G |
| Ex. 6 | 0.5 | 0.2 | 21 | G |
| Ex. 7 | 0.4 | 0.2 | 16 | G |
| Ex. 8 | 0.3 | 0.2 | 13 | G |
| Ex. 9 | 0.55 | 0 | 34 | G |
| Ex. 10 | 0.5 | 0 | 23 | G |
| Ex. 11 | 0.4 | 0 | 18 | G |
| Ex. 12 | 0.3 | 0 | 12 | G |
| Ref. Ex. 1 | 1.3 | 1 | 200 | G |
| Ref. Ex. 2 | 1 | 1 | 85 | G |
| Ref. Ex. 3 | 0.8 | 1 | 40 | G |
| Ref. Ex. 4 | 1 | 1 | 92 | G |
| Ref. Ex. 5 | 0.8 | 1 | 54 | G |
| Ref. Ex. 6 | 0.7 | 1 | 31 | G |
| Ref. Ex. 7 | 0.6 | 1 | 12 | G |
| Ref. Ex. 8 | 1 | 1 | 98 | G |
| Ref. Ex. 9 | 0.8 | 1 | 72 | G |
| Ref. Ex. 10 | 0.6 | 1 | 25 | G |
| Ref. Ex. 11 | 1 | 0.4 | 82 | G |
| Ref. Ex. 12 | 0.8 | 0.4 | 65 | G |
| Ref. Ex. 13 | 0.6 | 0.4 | 40 | G |
| Ref. Ex. 14 | 1 | 0.2 | 88 | G |
| Ref. Ex. 15 | 0.8 | 0.2 | 62 | G |
| Ref. Ex. 16 | 0.6 | 0.2 | 35 | G |
| Ref. Ex. 17 | 1 | 0 | 90 | G |
| Ref. Ex. 18 | 0.8 | 0 | 67 | G |
| Ref. Ex. 19 | 0.6 | 0 | 42 | G |
| Ref. Ex. 20 | 0.8 | 0 | 45 | G |
| Ref. Ex. 21 | 1 | 0.6 | 87 | G |
| Ref. Ex. 22 | 0.8 | 0.6 | 77 | G |
| Ref. Ex. 23 | 0.6 | 0.6 | 14 | G |
| Comp. Ex. 1 | 0.55 | 1 | 4 | NG |
| Comp. Ex. 2 | 0.5 | 1 | 2 | NG |
| Comp. Ex. 3 | 0.55 | 1 | 5 | NG |
| Comp. Ex. 4 | 0.5 | 1 | 2 | NG |
| Comp. Ex. 5 | 0.55 | 0.6 | 8 | NG |
| Comp. Ex. 6 | 0.5 | 0.6 | 4 | NG |

With respect to Reference Example 1, the amount of Mg is 1 part by mole, and the thickness of the ceramic layers defining the inner layer portion is 1.3 μm; in this case, the MTTF is 200 hours and thus, evaluated as "G".

With respect to Reference Example 2, the amount of Mg is 1 part by mole, and the thickness of the ceramic layers defining the inner layer portion is 1 μm; in this case, the MTTF is 85 hours and thus, evaluated as "G". With respect to Reference Example 4, the amount of Mg is 1 part by mole, and the thickness of the ceramic layers defining the inner layer portion is 1 μm; in this case, the MTTF is 92 hours and thus, evaluated as "G".

Similarly, with respect to Reference Example 3, the amount of Mg is 1 part by mole, and the thickness of the ceramic layers defining the inner layer portion is 0.8 μm; in this case, the MTTF is 40 hours and thus, evaluated as "G". With respect to Reference Example 5, the amount of Mg is 1 part by mole, and the thickness of the ceramic layers defining the inner layer portion is 0.8 μm; in this case, the MTTF is 54 hours and thus, evaluated as "G".

Accordingly, with respect to each of Reference Examples 1 to 5, the MTTF is not less than 12 hours and thus, evaluated as "G", while the thickness of the ceramic layers defining the inner layer portion is not less than 0.8 μm and not more than 1.3 μm. This indicates that it is difficult to reduce the thickness of the ceramic layers defining the inner layer portion.

The foregoing results therefore indicate that in thin-layer regions, if the thickness of the ceramic layers defining the inner layer portion is large, the MTTF will be improved, and high reliability will be achieved. In this case, however, because the thickness of the ceramic layers defining the inner layer portion is large, it will be difficult to achieve a desired capacitance.

With respect to each of Reference Examples 6 and 7, the amount of Mg is 1 part by mole, and the thickness of the ceramic layers defining the inner layer portion is 0.7 μm or 0.6 μm, respectively; in this case, the MTTF is 31 hours or 12 hours, respectively, and thus, evaluated as "G".

With respect to each of Reference Examples 8, 9 and 10, the amount of Mg is 1 part by mole, and the thickness of the ceramic layers defining the inner layer portion is 1 μm, 0.8 μm, or 0.6 μm respectively; in this case, the MTTF is 98 hours, 72 hours, or 25 hours, respectively, and thus, evaluated as "G".

On the other hand, with respect to each of Comparative Examples 1 and 2, the amount of Mg is 1 part by mole, and the thickness of the ceramic layers defining the inner layer portion is 0.55 μm or 0.5 μm, respectively; in this case, the MTTF is 4 hours or 2 hours, respectively, and thus, evaluated as "NG".

With respect to each of Comparative Examples 3 and 4, the amount of Mg is 1 part by mole, and the thickness of the ceramic layers defining the inner layer portion is 0.55 μm or 0.5 μm, respectively; in this case, the MTTF is 5 hours or 2 hours, respectively, and thus, evaluated as "NG".

The foregoing indicates that when the amount of Mg is 1 part by mole, the thickness of the ceramic layers defining the inner layer portion cannot be reduced down to a range of not more than 0.55 μm.

With respect to each of Reference Examples 21, 22 and 23, the amount of Mg is 0.6 part by mole, and the thickness of the ceramic layers defining the inner layer portion is 1 μm, 0.8 μm, or 0.6 μm, respectively; in this case, the MTTF is 87 hours, 77 hours, or 14 hours, respectively, and thus, evaluated as "G".

On the other hand, with respect to each of Comparative Examples 5 and 6, the amount of Mg is 0.6 part by mole, and the thickness of the ceramic layers defining the inner layer portion is 0.55 μm or 0.5 μm, respectively; in this case, the MTTF is 8 hours or 4 hours, respectively, and thus, evaluated as "NG".

The foregoing indicates that similarly when the amount of Mg is 0.6 part by mole, the thickness of the ceramic layers defining the inner layer portion cannot be reduced down to a range of not more than 0.55 μm.

With respect to each of Examples 1 to 12 within the scope of the present invention, the amount of Mg is not less than 0 part by mole and not more than 0.4 part by mole, and the thickness of the ceramic layers defining the inner layer portion is not more than 0.55 μm; nevertheless, the MTTF in each example is not less than 12 hours, and thus, evaluated as "G".

It is noted that in each of Reference Examples 11 to 20, the amount of Mg is not less than 0 part by mole and not more than 0.4 part by mole, and the MTTF is not less than 12 hours, and thus, evaluated as "G". However, the thickness of the ceramic layers defining the inner layer portion is not less than 0.6 µm and not more than 1 µm.

The foregoing Experimental Examples confirmed that when the amount of Mg contained in the ceramic layers defining the inner layer portion is not less than 0 part by mole and not more than 0.4 part by mole, per 100 parts by mole of Ti, highly reliable multilayer ceramic capacitors are achieved.

A mechanism whereby the reliability of a multilayer ceramic capacitor decreases when the amount of Mg contained in the ceramic layers defining the inner layer portion with a reduced thickness is increased is believed to be as follows.

A compound containing Ni and Mg is formed by the reaction of Mg contained in the ceramic layers defining the inner layer portion with Ni as the main component of the internal electrodes. This compound, which is formed as a protrusion projecting from an internal electrode toward a ceramic layer for the inner layer portion, reduces the insulation property of the portion where it is formed. This has a significant influence particularly on the thin-layer regions of ceramic layers defining the inner layer portion, and dielectric ceramic particles having a large grain size.

Thus, the formation of the compound containing Ni and Mg is reduced by reducing the amount of Mg contained in the ceramic layers defining the inner layer portion much more than the conventionally used amount. It is believed that as a consequence of this, the insulation property of the ceramic layers defining the inner layer portion is maintained.

In order to confirm the mechanism described above, a WT cross section of a multilayer ceramic capacitor was observed.

Figure 9A:
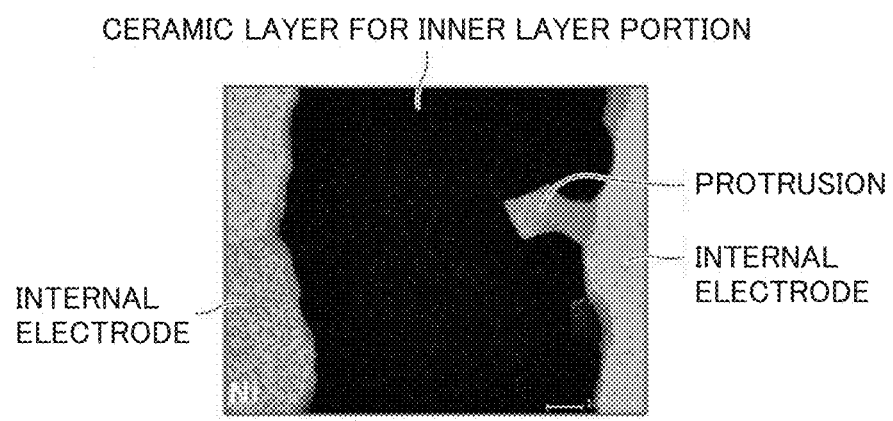
FIG. 9A is an SIM image of a cross section obtained by machining a WT cross section of a multilayer ceramic capacitor into thin pieces (Focused Ion Beam (FIB) milling), as a mapping image showing the Ni distribution using a mapping analysis by STEM-EDX.
Figure 9B:
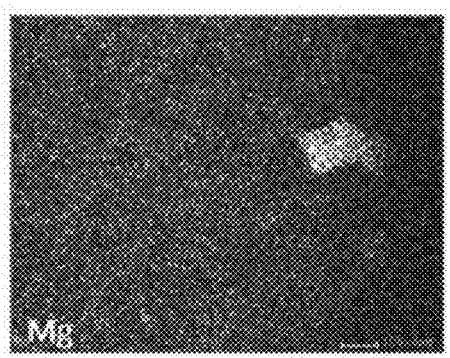
FIG. 9B is a mapping image showing the Mg distribution using a mapping analysis by STEM-EDX conducted on the cross section observed in FIG. 9A.

FIG. 9A is an SIM image of a cross section obtained by machining a WT cross section of a multilayer ceramic capacitor into thin pieces (Focused Ion Beam (FIB) milling), as a mapping image showing the Ni distribution using a mapping analysis by STEM-EDX conducted on the observed cross section. FIG. 9B is an SIM image of a cross section obtained by machining the WT cross section of the multilayer ceramic capacitor into thin pieces (Focused Ion Beam (FIB) milling), as a mapping image showing the Mg distribution using a mapping analysis by STEM-EDX conducted on the observed cross section. FIGS. 9A and 9B are images taken from the same view for a sample of Reference Example 1.

First, the multilayer ceramic capacitor sample was allowed to stand upright, and the sample was embedded in cured resin. At this time, the sample was ground with a grinder, so as to expose a WT cross section of the sample in a position approximately half its length in the length (L) direction. Next, the sample was machined into thin pieces by FIB milling using FIB (Focused Ion Beam) (from Seiko Instruments Inc., model: SMI-3050R), for use in observing the compound containing Ni and Mg formed as a protrusion on a ceramic layer for the inner layer portion, using an SIM (Scanning Ion Microscope). The sample was observed in a 5 µm square region and a 15 µm square region. The thickness of the sample for observation was about 100 nm, for example.

Next, the Ni and Mg distributions in the ceramic layers defining the inner layer portion were observed.

The sample for observation machined into thin pieces as described above was subjected to an elementary analysis by STEM-EDX mapping using a scanning transmission electron microscope (hereinafter referred to as the "STEM") and energy dispersive x-ray spectroscopy (hereinafter referred to as the "EDX") to obtain a mapping image showing the Ni and Mg distributions. In the STEM analysis, JEM-2200FS (from JEOL) was used as the STEM. The acceleration voltage was 200 kV. JED-2300T (from JEOL), which is an SDD detector with a diameter of 60 mm$^2$, was used as the EDX, and Noran System 7 was used as an EDX system.

From the mapping images shown in FIGS. 9A and 9B, a projection formed from the internal electrode toward the ceramic layer for the inner layer portion was observed. Moreover, because this protrusion contains Mg and Ni distributed in the same region, the formation of a compound because of the inclusion of Mg was confirmed.

It is noted that the present invention is not limited to the foregoing preferred embodiments, and various modifications may be made thereto within the gist of the scope of the present invention. Further, the thickness and the number of the ceramic layers, as well as the area and the outside dimension of a counter electrode in a ceramic electronic component, are not limited to those illustrated above.

It should be understood that the preferred embodiments disclosed herein are illustrative and non-restrictive in every respect. The scope of the present invention is defined by the terms of the claims, and is intended to include any modifications within the scope and meaning equivalent to the terms of the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a ceramic body including:
      a first end surface and a second end surface opposite to the first end surface;
      a first side surface and a second side surface perpendicular or substantially perpendicular to the first end surface and the second end surface;
      a first main surface and a second main surface perpendicular or substantially perpendicular to the first end surface and the first side surface;
      a plurality of dielectric ceramic layers; and
      internal electrodes extending in a direction connecting the first main surface and the second main surface, with a respective one of the dielectric ceramic layers interposed between adjacent ones of the internal electrodes; and
   external electrodes each provided on a respective one of the first end surface and the second end surface of the ceramic body; wherein
   the internal electrodes include a first internal electrode and a second internal electrode;
   the first internal electrode and the second internal electrode extend alternately to a respective one of the first end surface and the second end surface to be connected with a respective one of the external electrodes;
   an inner layer portion of the ceramic body includes a region sandwiched between the internal electrodes located nearest to the first and second main surfaces, and an outer layer portion including the dielectric ceramic layers located nearest to each of the first and second main surfaces;
   the dielectric ceramic layers of the inner layer portion including as a main component a perovskite-type compound containing Ba and Ti;

an amount of Mg contained in the dielectric ceramic layers of the inner layer portion is not less than 0 part by mole and not more than about 0.4 part by mole, per 100 parts by mole of Ti; and each of the dielectric ceramic layers of the inner layer portion has a thickness of not more than about 0.55 μm.

2. The multilayer ceramic capacitor according to claim 1, wherein a side margin is defined by a region not containing the first internal electrode and the second internal electrode when the ceramic body is seen in the lamination direction, the amount of Mg in the side margin is not less than about 0.5 part by mole and not more than about 5.0 parts by mole, per 100 parts by mole of Ti.

3. The multilayer ceramic capacitor according to claim 1, wherein the ceramic body has a rectangular or substantially rectangular parallelepiped shape.

4. The multilayer ceramic capacitor according to claim 1, wherein a foreign layer is provided at the ends of the internal electrodes.

5. The multilayer ceramic capacitor according to claim 1, wherein the ceramic layers defining the inner layer portion include dielectric ceramic particles.

6. The multilayer ceramic capacitor according to claim 5, wherein each of the dielectric ceramic particles has a grain size of not more than about 0.18 μm.

7. The multilayer ceramic capacitor according to claim 1, wherein the outer layer portion is made of a same dielectric ceramic material as that of the inner layer portion.

8. The multilayer ceramic capacitor according to claim 1, wherein the outer layer portion is made of a different dielectric ceramic material than that of the inner layer portion.

9. The multilayer ceramic capacitor according to claim 1, wherein the outer layer portion contains Si in an amount greater than that in the inner layer portion.

10. The multilayer ceramic capacitor according to claim 1, wherein a thickness of the outer layer portion is about 30 μm.

11. The multilayer ceramic capacitor according to claim 1, wherein the first and second internal electrodes are made of Ni or Cu.

12. The multilayer ceramic capacitor according to claim 1, wherein a thickness of each of the first and second internal electrodes is not less than about 0.3 μm and not more than about 2.0 μm.

13. The multilayer ceramic capacitor according to claim 2, wherein the side margin includes a protrusion.

14. The multilayer ceramic capacitor according to claim 13, wherein the protrusion has a size of about 0.1 μm to about 0.2 μm.

15. The multilayer ceramic capacitor according to claim 1, wherein the external electrodes each have a multi-layer structure.

16. The multilayer ceramic capacitor according to claim 1, wherein the external electrodes each include three layers.

17. The multilayer ceramic capacitor according to claim 1, wherein the external electrodes each include a baked Cu layer, a plated Ni layer, and a plated Sn layer.

* * * * *